United States Patent
Fossum

(10) Patent No.: US 8,244,980 B2
(45) Date of Patent: Aug. 14, 2012

(54) SHARED CACHE PERFORMANCE

(75) Inventor: Tryggve Fossum, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 11/472,877

(22) Filed: Jun. 21, 2006

(65) Prior Publication Data

US 2007/0300016 A1    Dec. 27, 2007

(51) Int. Cl.
*G06F 12/08* (2006.01)
(52) U.S. Cl. ................ 711/128; 711/E12.017
(58) Field of Classification Search .......... 711/128
See application file for complete search history.

(56) References Cited

U.S. PATENT DOCUMENTS

| | | | | |
|---|---|---|---|---|
| 6,385,697 B1 * | 5/2002 | Miyazaki | ............... | 711/128 |
| 6,560,677 B1 * | 5/2003 | Bridges et al. | ............... | 711/129 |
| 6,848,025 B2 * | 1/2005 | Song et al. | ............... | 711/128 |
| 7,330,935 B2 * | 2/2008 | Yamazaki | ............... | 711/128 |
| 2002/0108021 A1 * | 8/2002 | Syed et al. | ............... | 711/128 |
| 2002/0188807 A1 * | 12/2002 | Chaudhry et al. | ............ | 711/128 |
| 2003/0014594 A1 * | 1/2003 | Krimer et al. | ............... | 711/128 |
| 2005/0015555 A1 * | 1/2005 | Wilkerson | ............... | 711/128 |
| 2005/0223173 A1 * | 10/2005 | Yamazaki | ............... | 711/128 |
| 2005/0246499 A1 * | 11/2005 | Saida et al. | ............... | 711/128 |
| 2006/0004963 A1 * | 1/2006 | Mattina et al. | ............... | 711/130 |
| 2006/0277365 A1 * | 12/2006 | Pong | ............... | 711/128 |
| 2007/0136530 A1 * | 6/2007 | Tanaka | ............... | 711/128 |

* cited by examiner

*Primary Examiner* — Edward Dudek, Jr.
*Assistant Examiner* — Ryan Dare
(74) *Attorney, Agent, or Firm* — Mnemoglyphics, LLC; Lawrence M. Mennemeier

(57) ABSTRACT

A method and apparatus for improving shared cache performance. In one embodiment, the present invention includes a cache having multiple ways. A locality tester measures a first locality of a first process and second locality of a second process. A first set of multiple ways stores the data used by the first process and a second set of multiple ways stores the data used by the second process, where the second set is a superset of the first set.

31 Claims, 5 Drawing Sheets

SHARED CACHE PERFORMANCE

BACKGROUND INFORMATION

Since the beginning of computing, processors have been faster than memories. Even though memory technology has evolved and improved over time, so has processor technology. What this means is that processors often have to remain idle for substantial amounts of time while waiting for the memory to respond to a request for data. As a result, system performance may be negatively impacted.

Computer systems have evolved to include memory hierarchies comprising various types of long term storage, main memory, and one or more levels of cache. However, as one moves down the down the memory hierarchy from caches to long term storage, device access times increase dramatically. An ideal solution is to have enough cache memory or fast main memory available to service the currently executing program. But in most systems, such memory is present in only limited amounts or the program demands more memory than is available.

Caches generally function by keeping often used or recently used data close to or within the processor. The idea is that by storing recently used data in close proximity to the processor, the next time a memory request is made for that particular data, a long memory access to main memory or the hard disk drive is not necessary. When a computer starts up, the cache is empty. But over time, the cache continues to fill up until there are no longer any empty entries for new data. This is not a problem as long as invalid entries are available for replacement. But if all existing entries are valid, the cache replacement logic may delete valid entries to make room for incoming data.

Normally, caches work very well, as many programs exhibit temporal and spatial locality and may thus re-use cached data multiple times. However, some programs have a memory access pattern with little data re-use, which makes caches less effective (or even ineffective). Examples are streaming media programs (audio, video, etc) which access data one time and in sequence, and programs which iterate over large (relative to cache size) data sets. When multiple programs are sharing a cache, a program having poor data re-use may compete with another program having good data re-use, causing useful data to be pushed out of the cache. Thus the useful data may be brought in and then pushed out, again and again. This is an example of what is called cache thrashing and may have a detrimental effect on overall system performance.

In light of the foregoing and other deficiencies, it is known in the prior art to improve cache performance utilizing a variety of techniques, including: (1) profile-based compilation, (2) increasing the associatively of the cache, or (3) using stream buffers (FIFOs) to speculatively store sequential data. Profile-based compilation is a static optimization based on results obtained for a certain system configuration and mix of programs running on that system, and may not be effective in a different system configuration or under a different mix of programs. Increasing the associatively of the cache allows it to store data more flexibly, but in some cases this only delays cache thrashing and does not solve the fundamental problem. It also adds costs and complexity, which may not be a practical solution. A stream buffer is not effective if the data is not sequential (because stream buffers do not provide random access), and it occupies space in the design whether it is used or not.

Therefore, there is a need for improved systems and methods which address these and other shortcomings of the prior art.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

Reference throughout this specification to "one embodiment" or "an embodiment" means that a particular feature, structure or characteristic described in connection with the embodiment is included in at least one embodiment of the present invention. Thus, appearances of the phases "in one embodiment" or "in an embodiment" in various places throughout this specification are not necessarily all referring to the same embodiment. Furthermore, the particular features, structures or characteristics may be combined in any suitable manner in one or more embodiments.

Throughout the specification, the following terms are used. The term, "process" is used generally to refer to a process, thread, program, sequence of instructions, etc., being executed by a processor. The term "locality" is used generally to refer to the temporal and spatial locality of data requested, the amount of cache data re-use, etc., of a process.

It will be appreciated that, for other embodiments, a different system configuration may be used. For example, while the above description includes a chip multiprocessor system, for other embodiments, a system including at least one processor core may benefit from the various embodiments of improved cache performance. Specifically, the present invention may be applicable to any embodiment where a cache exists and it is used in multiple applications or used for different purposes in the same application. Furthermore, a different type of system or different type of computer system such as, for example, a server, a workstation, a desktop computer system, a gaming system, an embedded computer system, a blade server, etc., may be used for other embodiments.

Figure 1:
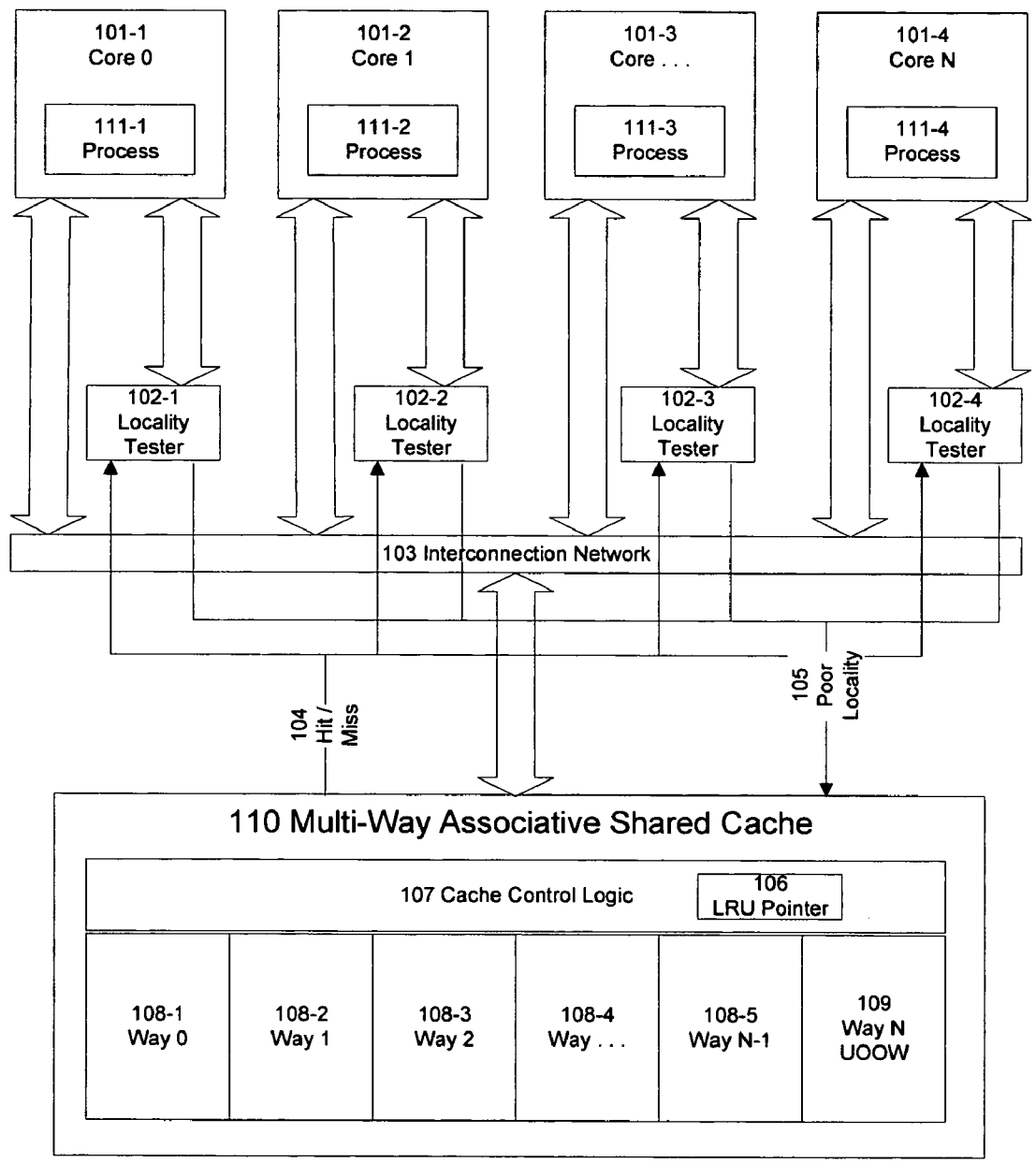
FIG. 1 is a block diagram illustrating an embodiment of a shared cache memory system for a chip multi-processor.

FIG. 1 is a block diagram illustrating a shared cache memory system of a chip multi-processor, including multiple processor cores 101. Each of the multiple processor cores 101 may be running an associated process 111, each processor core 101 having an associated locality tester 102 in accordance with one embodiment, and a multi-way associative shared cache 110. Although only one process 111 is shown, a processor core 101 may be capable of running multiple processes. Each processor core 101 is connected to an associated locality tester 102. Each processor core 101 communicates with the multi-way associative shared cache 110 via interconnection network 103 to request and receive cached data. For each processor core 101, the multi-way associative shared cache 110 communicates a hit/miss status ("hit/miss") 104 to the associated locality tester 102. The locality tester 102 communicates a poor locality status ("poor locality") 105 to the multi-way associative shared cache 110. The multi-way associative shared cache 110 includes cache control logic 107, ways 108, and a use only once way ("UOOW") 109. The cache control logic 107 includes LRU pointer 106. As shown in FIG. 1, the present invention is applicable to a chip multi-processor containing (1) any number of cores, including one, and (2) a multi-way associative shared cache having two or more ways.

Each processor core 101 communicates with its associated locality tester 102. When a processor core 101 begins to run a new process 111, it may initialize or reset the locality tester 102. The processor core 101 may also communicate a locality threshold (or criteria), commonly implemented as a numeric limit, to the locality tester 102. The locality threshold may be influenced by cache size and configuration, and it may also be influenced by the characteristics of the process 111. For example, if a process 111 performs significant speculative pre-fetch operations, then the threshold might be made more sensitive. The locality threshold may also be adjusted dynamically according to the process 111 being run. While a process 111 is running, a locality tester 102 may communicate a status to its associated processor core 101. The multi-way associative shared cache 110 may also communicate performance information to a processor core 101. Both the locality tester status and the performance information may be used by the processor core 101 to dynamically assess cache performance. If the processor core 101 determines that cache performance is below expectations, it may disable its associated locality tester 102. Although not shown in FIG. 1, if the processor core 101 is capable of running multiple processes, then it may be desirable to have a locality tester 102 per process 111 rather than a locality tester 102 per processor core 101.

The cache control logic 107 of the multi-way associative shared cache 110 performs various functions, including data replacement. If the requested data is not contained in the cache, then the requested data may be brought into the cache from elsewhere. If the cache is full when requested data is brought in (or fetched), then the cache control logic 107 may select existing data in a way 108 for replacement. A common strategy for cache data replacement is Least Recently Used (LRU), or an approximation of it. However, if the cache is in a trashing condition, this is not always effective. If data is brought in and then never re-used, it may sit in the cache until it becomes the LRU data. In the meantime, useful data may be replaced. The present invention addresses this problem.

In one embodiment, the locality tester 102 (associated with a processor core 101 running a process 111) receives a hit/miss status 104 from the cache control logic 107. This hit/miss status 104 is used by the locality tester 102 to dynamically adjust the measured locality (data reuse) of the current process 111. A hit may increase the measured locality and a miss may decrease the measured locality. The locality tester 102 may compare the measured locality with a locality threshold (or limit) provided by the associated processor core 101. If the process 111, as currently measured, is deemed to have good locality, the locality tester 102 does not communicate a poor locality 105 status to cache control logic 107, and the data replacement strategy utilizing LRU pointer 106 functions normally.

If the process 111 as currently measured is deemed to have poor locality, the locality tester 102 communicates a poor locality status 105 to cache control logic 107. When cache control logic 107 receives a poor locality status 105, the normal data replacement strategy is bypassed. All data replacement for the associated process is directed to the use only once way (UOOW) 109. The LRU pointer 106 is not updated when the UOOW 109 is selected (i.e. during a poor locality condition). Thus the data with little or no expected re-use is stored in the UOOW 109, where it replaces other data with little or no expected re-use, and the useful data is preserved in the other cache ways 108. Note that this embodiment is not dependent on an LRU data replacement strategy, as it could be used to bypass other data replacement strategies in a similar manner under similar conditions.

Since the locality of the current process 111 is dynamically measured, it is possible for the poor locality 105 status to change several times while the current process is running. For example, if the current process 111 has a first phase where its locality is good, then the poor locality 105 status may be disabled. If the current process 111 then transitions into a second phase where its locality is poor, then the poor locality 105 status may be enabled and the UOOW 109 data replacement activated. If the current process 111 then transitions into a third phase where its locality is again good, then the poor locality 105 status may again be disabled. Any number of additional transitions between poor locality enabled and disabled may be made, depending on the locality measured dynamically by the locality tester 102. This ability to dynamically measure locality and change status allows the present invention to respond to varying job loads that might be encountered.

Although Way N is designated the UOOW 109 as shown in FIG. 1, any of the ways 108 could be designated the UOOW, or any number of ways comprising a proper subset of ways 108 may be designated as UOOWs. Thus a process having poor locality is restricted to storing data in a proper subset (the UOOW or UOOWs) of ways 108 while a process having good locality is not restricted to the proper subset and can utilize any of ways 108, including the UOOW(s), for storing data. Thus the set of ways available to a process having good locality is a proper superset of the ways available to a process having poor locality. Note that the UOOW functions as a normal way in the multi-way associative shared cache 110 if a poor locality status is not being communicated to the cache control logic 107 by the locality tester 102. Additional cache memory (including special-use memory) is not required to practice the present invention. This has the benefit of preserving the fundamental form of the cache. Caches generally perform well, so as a design choice, it may be preferable to make as few changes as is practical.

Figure 2:
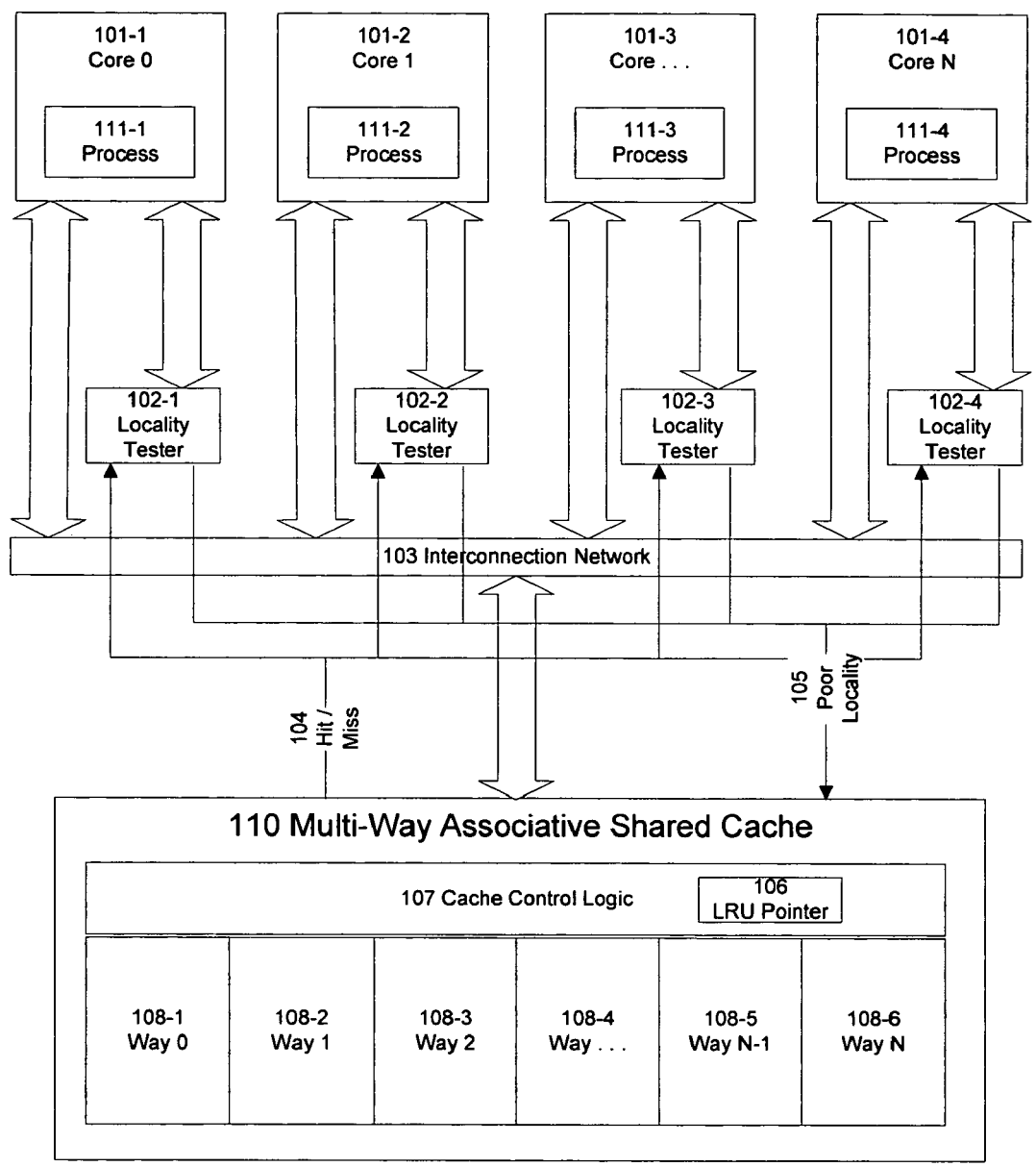
FIG. 2 is a block diagram illustrating another embodiment of a shared cache memory system for a chip multi-processor.

FIG. 2 is a block diagram illustrating another embodiment of a shared cache memory system for a chip multi-processor, incorporating the present invention. FIG. 2 does not include a UOOW 109; otherwise it is identical to FIG. 1. The operation and interrelationships between the blocks shown in FIG. 2, except the UOOW 109, is the same as described for FIG. 1 with the following difference.

Each of the multiple processor cores 101 may be running an associated process 111, each processor core 101 having an associated locality tester 102 in accordance with one embodiment, and a multi-way associative shared cache 110. Although only one process 111 is shown, a processor core 101 may be capable of running multiple processes. Each processor core 101 is connected to an associated locality tester 102. Each processor core 101 communicates with the multi-way associative shared cache 110 via interconnection network 103 to request and receive cached data. For each processor core 101, the multi-way associative shared cache 110 communicates a hit/miss status ("hit/miss") 104 to the associated locality tester 102. The locality tester 102 communicates a poor locality status ("poor locality") 105 to the multi-way associative shared cache 110. The multi-way associative shared cache 110 includes cache control logic 107 and ways 108. The cache control logic 107 includes LRU pointer 106. As shown in FIG. 1, the present invention is applicable to a chip multi-processor containing (1) any number of cores, including one, and (2) a multi-way associative shared cache having two or more ways.

When cache control logic 107 receives a poor locality status 105, the data replacement strategy is changed. All data replacement for the associated process is directed to use the way currently selected by the LRU pointer 106. The LRU pointer 106 is not updated when the cache control logic 107 receives a poor locality status 105. Thus the data with little or no expected re-use replaces the data with the least expected re-use (i.e. where the LRU was pointing), and the useful data is preserved in the other cache ways 108. In essence, the way currently selected by the LRU pointer 106 acts like a dynamic UOOW. Note that this embodiment is dependent on a LRU data replacement strategy. However, a dynamic UOOW may be implemented in other embodiments which are not dependent on a LRU data replacement strategy.

Figure 3:
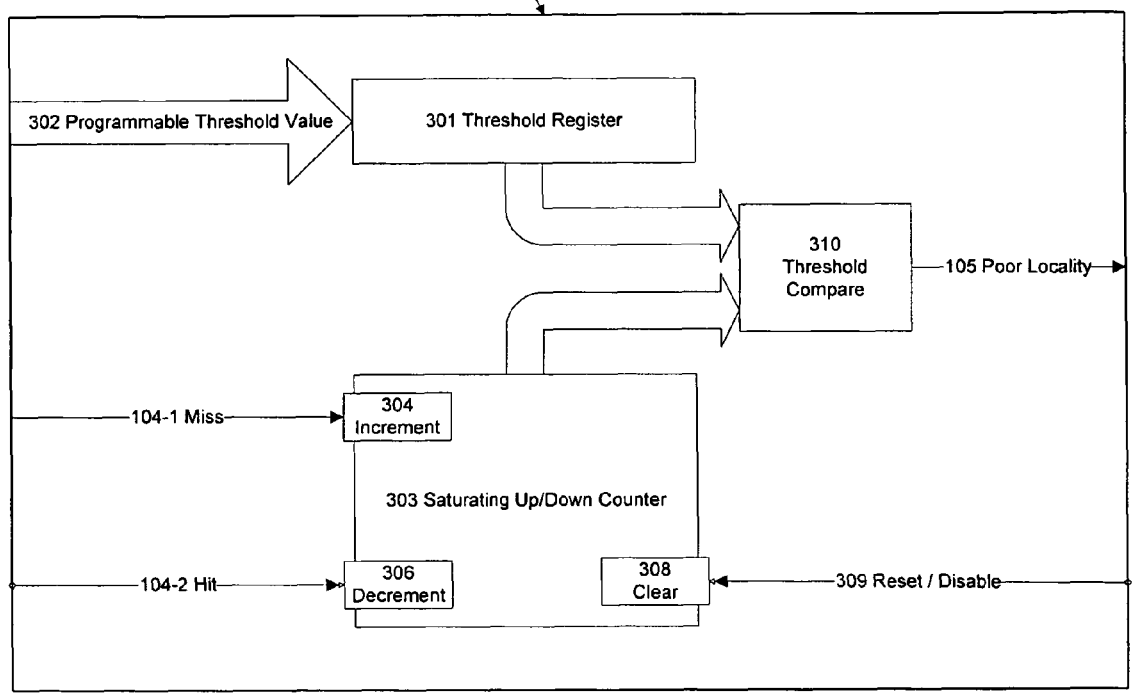
FIG. 3 is a block diagram further illustrating a locality tester of FIGS. 1 and 2.

FIG. 3 is a block diagram further illustrating the locality tester of FIGS. 1 and 2, in accordance with one embodiment. The locality tester 102 measures hit/miss performance and produces a configurable assessment of process locality. The locality tester 102 includes a threshold register 301, a saturating up/down counter 303, and a threshold compare 310.

The threshold register 301 may be loaded with a programmable threshold value 302 and may send the programmable threshold value 302 to the threshold compare 310. It is useful for the threshold register 301 and the saturating up/down counter 303 to be of corresponding sizes.

The saturating up/down counter 303 may be incremented when it receives a miss 305 signal on its increment 304 port and may be decremented when it receives a hit 307 signal on its decrement 306 port. The counter value may not exceed its saturation limit, regardless of the number of miss 305 signals received, and may not go below its cleared value (usually zero), regardless of the number of hit 307 signals received. Additionally, the saturating up/down counter 303 may be cleared (usually to zero) when it receives a reset/disable 309 signal on its clear 308 port. The counter size and frequency of reset are a design trade-off. A large counter may need to be reset more often, as it may take too long to recover from saturation. A small counter may need fewer resets, but is more prone to an oscillation mode and a small size reduces the possible number of threshold values. The saturating up/down counter 303 sends its value to the threshold compare 310.

The threshold compare 310 receives a threshold value from threshold register 301 and a counter value from the saturating up/down counter 303. If the counter value is greater than the threshold value, then threshold compare 310 outputs a poor locality 105 signal. If the counter value is less than the threshold old value, then threshold compare 310 does not output a poor locality 105 signal. If counter value is equal to threshold value, then threshold compare 310 may (or may not) output a poor locality 105 signal, depending on design choices.

Figure 4:
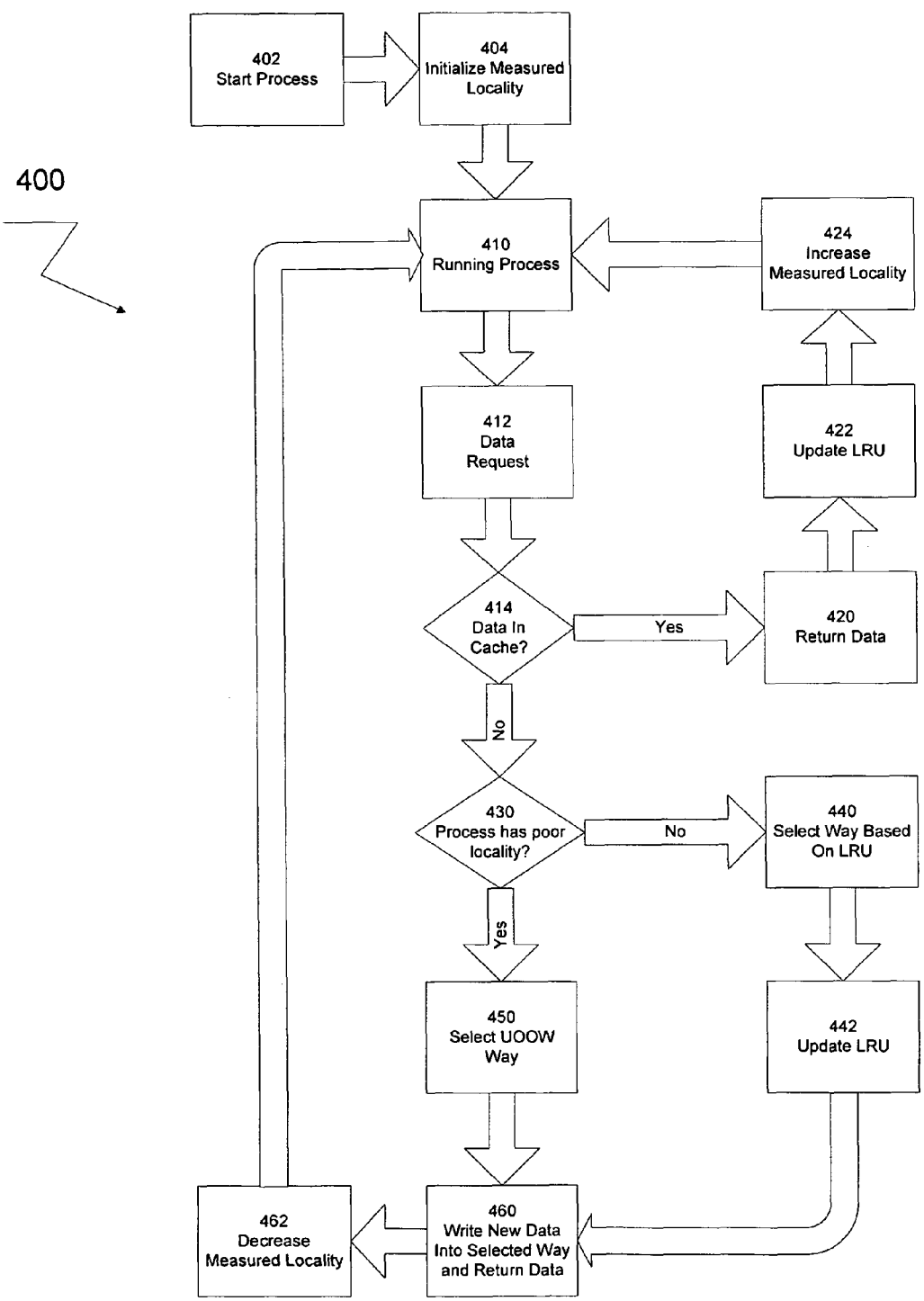
FIG. 4 is a flowchart illustrating a method for improving cache performance.

FIG. 4 is a flowchart illustrating a method 400 for improving cache performance, in accordance with one embodiment. Initially, a process is started 402 and a measured locality is initialized 404. As the process is running 410, it requests data 412 and the flow proceeds to decision block 414. If in decision block 414 the requested data is found in the cache, then the data is returned 420, the LRU is updated 422, the measured locality is increased 424, and the process continues to run 410.

However, if in decision block 414 the requested data is not found in cache, then the flow proceeds to decision block 430. If in decision block 430 the process does not have poor locality, then the LRU is used to select a cache way 440 in which data may be replaced. Then the LRU is updated 442. If in decision block 430 the process has poor locality, the UOOW is selected 450 as the cache way in which data may be replaced. The flow reconverges after steps 442 and 450; new data is written into the selected cache way and returned 460, the locality heuristic is updated 462, and the process continues to run 410. Note that this embodiment is not dependent on a LRU data replacement strategy, as it could function in a similar manner with other data replacement strategies.

Figure 5:
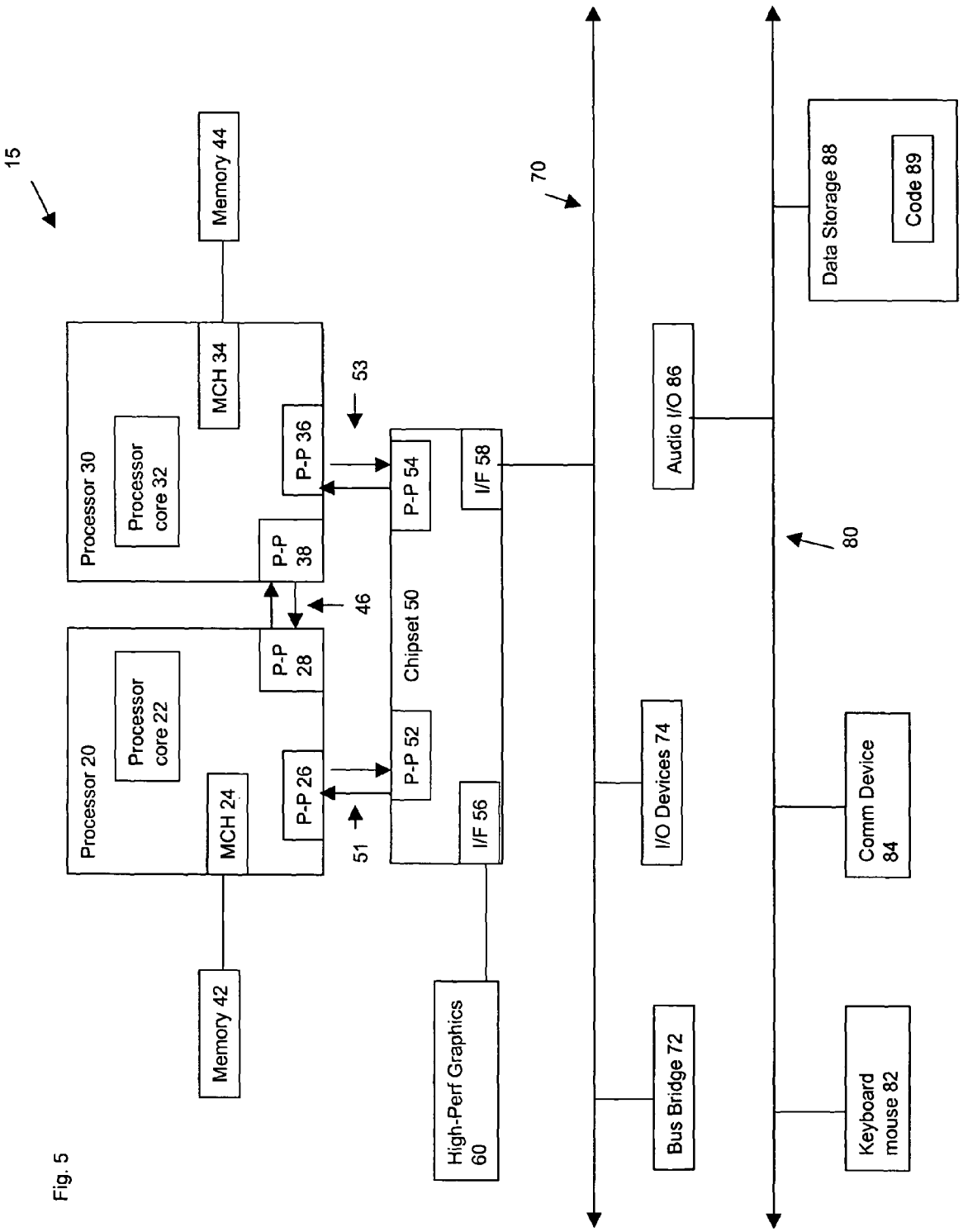
FIG. 5 is a block diagram depicting a representative processor based system in which the present embodiments may function.

FIG. 5 is a block diagram illustrating a system 15 which includes processors supporting improved shared cache performance in chip-level multiprocessors. The system 15 generally shows a system where processors, memory, and input/output devices are interconnected by a number of point-to-point interfaces. The system 15 may also include several processors, of which only two, processors 20, 30 are shown for clarity. Each processor 20, 30 may each include a processor core 22, 32, respectively. Processors 20, 30 may each include a local memory controller hub (MCH) 24, 34 to connect with memory 42, 44. Processors 20, 30 may exchange data via a point-to-point interface 46 using point-to-point interface circuits 28, 38. Processors 20, 30 may each exchange data with a chipset 50 via individual point-to-point interfaces 51, 53 using point to point interface circuits 26, 52, 36, 54. Chipset 50 may also exchange data with a high-performance graphics circuit 60 via a high-performance graphics interface 56.

The chipset 50 may exchange data with a bus 70 via a bus interface 58. In either system, there may be various input/output I/O devices 74 on the bus 70, including in some embodiments low performance graphics controllers, video controllers, and networking controllers. Another bus bridge 72 may in some embodiments be used to permit data exchanges between bus 70 and bus 80. Bus 80 may in some embodiments be a small computer system interface (SCSI) bus, and integrated drive electronics (IDE) bus, or a universal serial bus (USB). Additional I/O devices may be connected with bus 80. These may include keyboard and cursor control devices 82, including mouse, audio I/O 86, communications devices 84, including modems and network interfaces, and data storage devices 88. Software code 89 may be stored on data storage device 88. In some embodiments, data storage device 88 may be a fixed magnetic disk, a floppy disk drive, an optical disk drive, a magneto-optical disk drive, a magnetic tape, or non-volatile memory including flash memory.

Having disclosed embodiments and the best mode, modifications and variations may be made to the disclosed embodiments while remaining within the scope of the embodiments of the invention as defined by the following claims.

What is claimed is:

1. A method comprising:
   determining if a process has a poor locality with respect to a shared cache based on a per-process locality measure taken during actual usage of the shared cache by the process;
   in response to a miss of the shared cache for a data request associated with the process, selecting any way of the plurality of ways within the shared cache for replacement based on a replacement algorithm responsive to determining the process does not have poor locality with respect to the shared cache; and
   selecting a way within a restricted subset of the plurality of ways within the shared cache for replacement responsive to determining the process has poor locality with respect to the shared cache, while a plurality of other processes having good locality are capable of selecting any way of the plurality of ways within the shared cache for replacement.

2. The method of claim 1 wherein determining if a process has a poor locality with respect to the shared cache comprises:
   updating a counter in a first direction in response to a miss of the shared cache associated with the process;
   updating the counter in a second direction in response to a hit of the shared cache associated with the process;
   determining the process has poor locality with respect to the shared cache in response to the counter being updated to a threshold value.

3. The method of claim 1, wherein the replacement algorithm includes a least recently used (LRU) algorithm, and wherein the shared cache further comprises a least recently used pointer to point to a least recently used way.

4. The method of claim 3 further comprising updating the least recently used pointer in response to selecting any way of the plurality of ways within the shared cache for replacement based on a replacement algorithm responsive to determining the process does not have poor locality with respect to the shared cache and not updating the least recently used pointer in response to selecting a way within a restricted subset of the plurality of ways within the shared cache for replacement responsive to determining the process has poor locality with respect to the shared cache.

5. The method of claim 2 wherein the threshold value is programmable.

6. The method of claim 4 wherein the restricted subset of the plurality of ways includes the least recently used way pointed to by the least recently used pointer which is not updated in response to selecting the least recently used way within the shared cache for replacement responsive to determining the process has poor locality with respect to the shared cache.

7. The method of claim 4, wherein the restricted subset of the plurality of ways includes a static subset of use only once ways (UOOWs).

8. The method of claim 4 further comprising:
   determining if a second process has a poor locality with respect to the shared cache;
   in response to a second miss of the shared cache for a second data request associated with the second process, selecting any way of the plurality of ways within the shared cache for replacement based on the replacement algorithm responsive to determining the second process does not have poor locality with respect to the shared cache; and
   selecting a way within the restricted subset of the plurality of ways within the shared cache for replacement responsive to determining the second process has poor locality with respect to the shared cache.

9. An apparatus comprising:
   a memory having multiple ways;
   a first locality tester coupled to the memory, to determine a first locality of a first process;
   a second locality tester coupled to the memory, to determine a second locality of a second process;
   a third locality tester coupled to the memory to determine a third locality of a third process; and
   control logic to restrict replacement for memory requests from the first process and the second process to a proper subset of the multiple ways in response to the first and the second localities being determined to be poor localities and to allow replacement for memory requests from the third process any way within the multiple ways in response to the third locality being determined to be a good locality.

10. The apparatus of claim 9 wherein the memory is a cache, and wherein the first process is to be executed on a first core of a microprocessor, the second process is to be executed on a second core of the microprocessor, and the third process is to be executed on the second core of the microprocessor.

11. The apparatus of claim 9, wherein the first locality is a poor locality and the second locality is a good locality.

12. The apparatus of claim 11 wherein the first, second and third locality each include:
   a counter to be incremented upon a miss to the memory from an associated process and to be decremented upon a hit to the memory from the associated process;
   a threshold register to hold a threshold value; and
   logic coupled to the counter and the threshold register to determine a good or poor locality of the associated process based on a value held in the counter as compared to the threshold value held in the threshold register.

13. The apparatus of claim 9 wherein the proper subset of the multiple ways includes a static number of use only once ways (UOOWs).

14. The apparatus of claim 9, further comprising a least recently used (LRU) pointer to point to a LRU way, wherein the proper subset includes the LRU way, and wherein the control logic is not to update the LRU pointer upon selecting the LRU way for replacement responsive to memory requests from the first process and the second processes in response to the first and the second localities being determined to be poor localities.

15. The apparatus of claim 14 wherein the control logic is to update the LRU pointer to point to a next LRU way upon selecting a way of the multiple ways for replacement responsive to memory requests from the third process in response to the third locality being determined to be a good locality.

16. The apparatus of claim 15 after the LRU pointer is updated to point to the next LRU way the proper subset includes the next LRU way, and wherein the control logic is not to update the LRU pointer form pointing to the next LRU way upon selecting the next LRU way for replacement after the LRU pointer is updated to the next LRU way responsive to memory requests form the first process and the second processes in response to the first and the second localities being determined to be poor localities.

17. An apparatus comprising:
   a processor including a shared cache, the shared cache including a plurality of ways;
   value storage logic coupled to the shared cache to hold a locality value per executing process, wherein the locality value is to be updated in a first direction in response to a miss of the shared cache associated with a first process to be executed on the processor and to be updated in a second direction in response to a hit of the shared cache associated with the first process;

control logic coupled to the shared cache and the value storage logic to restrict replacement in the shared cache for a memory request associated with the first process to a proper subset of the plurality of ways in response to the locality value held in the value storage logic reaching a threshold value.

18. The apparatus of claim 17 further comprising a programmable register to hold the threshold value, wherein the value storage logic includes a saturation counter, and wherein the first direction includes a decrement direction of the saturation counter and the second direction includes an increment direction of the saturation counter.

19. The apparatus of claim 18 further comprising comparison logic coupled to the saturation counter and the programmable register, the comparison logic to determine if the locality value held in the saturation counter has reached the threshold value.

20. The apparatus of claim 19 wherein the control logic is to allow replacement in the shared cache for the memory request in any of the plurality of ways in response to the locality value held in the value storage logic not reaching the threshold value.

21. A system comprising:
one or more cores;
a cache coupled to the cores, wherein the cache has multiple ways;
a first locality tester coupled to the cache, wherein the first locality tester to measure a good locality of a first process;
a second locality tester coupled to the cache, wherein the second locality tester to measure a bad locality of a second process;
control logic to select a way for eviction and replacement from the multiple ways in response to a miss of the cache for a memory request associated with the first process based on the first locality tester measuring the good locality of the first process and to select a way for eviction and replacement from a proper subset of the multiple ways in response to a second miss of the cache for a second memory request associated with the second process based on the second locality tester measure the bad locality of the second process.

22. The system of claim 21 wherein the first and second locality tester comprising:
a counter to hold a value;
a miss signal to increment the counter value;
a hit signal to decrement the counter value;
a threshold register to hold a threshold value; and
a comparator to output the first locality signal when counter value exceeds the threshold value.

23. The system of claim 22 wherein the locality tester further comprises a clear signal to reset the counter.

24. The system of claim 22, wherein the counter is saturating.

25. The system of claim 22 wherein the threshold value is programmable.

26. The system of claim 21 further comprising, control logic coupled to the cache.

27. The system of claim 26 wherein the control logic perform data replacement.

28. The system of claim 27 wherein the data replacement is least recently used data.

29. The system of claim 21 wherein said system comprises point-to-point interconnect.

30. The system of claim 21 wherein the system comprises a front side bus.

31. The system of claim 21 further comprising, an external interconnect circuit to send audio data from a processor; and an audio input/output device to receive said audio data.

* * * * *